United States Patent
Waldorf et al.

(10) Patent No.: US 9,955,304 B1
(45) Date of Patent: Apr. 24, 2018

(54) APPARATUS AND METHOD FOR TRACKING THE POSITION OF AN INTERMITTENTLY OPERABLE WI-FI TAG

(71) Applicant: Ipass Inc., Redwood City, CA (US)

(72) Inventors: Keith Waldorf, Santa Clara, CA (US); Marcos R. Lara, Menlo Park, CA (US); Raghu Konka, Pleasanton, CA (US)

(73) Assignee: Ipass Inc., Redwood Shores, CA (US)

( * ) Notice: Subject to any disclaimer, the term of this patent is extended or adjusted under 35 U.S.C. 154(b) by 0 days.

(21) Appl. No.: 15/333,104

(22) Filed: Oct. 24, 2016

(51) Int. Cl.
*H04W 24/00* (2009.01)
*H04W 4/02* (2018.01)
*H04W 64/00* (2009.01)
*H04B 17/318* (2015.01)

(52) U.S. Cl.
CPC .......... *H04W 4/023* (2013.01); *H04B 17/318* (2015.01); *H04W 64/003* (2013.01)

(58) Field of Classification Search
None
See application file for complete search history.

(56) References Cited

U.S. PATENT DOCUMENTS

| | | | | |
|---|---|---|---|---|
| 8,588,097 B1* | 11/2013 | Ogale | ................... | H04W 64/00 342/463 |
| 2006/0095348 A1* | 5/2006 | Jones | ........................ | G01S 5/02 705/29 |
| 2009/0024550 A1 | 1/2009 | Wynn et al. | | |
| 2009/0042557 A1* | 2/2009 | Vardi | .................... | H04W 72/02 455/422.1 |
| 2013/0233922 A1* | 9/2013 | Schoening | ........... | G06Q 10/087 235/385 |
| 2013/0331118 A1* | 12/2013 | Chhabra | ............... | H04W 48/16 455/456.1 |
| 2014/0073363 A1* | 3/2014 | Tidd | ....................... | G01S 5/0242 455/456.5 |
| 2015/0154621 A1* | 6/2015 | Taylor | ................ | G06Q 30/0207 705/14.1 |
| 2015/0186506 A1* | 7/2015 | Vandevoorde | ........ | G01S 5/0284 707/737 |
| 2015/0319604 A1* | 11/2015 | Gao | ...................... | H04W 48/16 370/338 |

* cited by examiner

*Primary Examiner* — Shantell L Heiber
(74) *Attorney, Agent, or Firm* — Cooley LLP (57) ABSTRACT

A server has a processor and a memory connected to the processor. The memory stores instructions executed by the processor to collect scan lists from client devices, where each scan list specifies a Wi-Fi access point identifier collected by a client device and geographic coordinates of the client device when the Wi-Fi access point identifier was collected. A cluster of geographic coordinates around a designated Wi-Fi access point is formed. A centroid within the cluster is identified. The location of the centroid is ascribed the geographic position of the designated Wi-Fi access point. The geographic position of the designated Wi-Fi access point is added to a Wi-Fi access point location database. A Wi-Fi tag scan list is processed to form a tag path listing known geographic locations of Wi-Fi access points observed by the Wi-Fi tag. The tag path is supplied in response to a request.

12 Claims, 6 Drawing Sheets

APPARATUS AND METHOD FOR TRACKING THE POSITION OF AN INTERMITTENTLY OPERABLE WI-FI TAG

FIELD OF THE INVENTION

This invention relates generally to tracking items in commerce. More particularly, this invention relates to techniques for tracking the position of an intermittently operable Wi-Fi tag attached to an item.

BACKGROUND OF THE INVENTION

It is known to track valuable items in commerce using cellular connections. For example, cargo ships and trucks are commonly outfitted with cellular devices that provide ongoing location updates. Such an approach is relatively expensive because a data plan is required for the cellular communications. In addition, such an approach consumes a relatively large amount of power. To track items of less value, these expenses are prohibitive.

Accordingly, there is a need to provide low cost and low power techniques for tracking items in commerce.

SUMMARY OF THE INVENTION

A server has a processor and a memory connected to the processor. The memory stores instructions executed by the processor to collect scan lists from client devices, where each scan list specifies a Wi-Fi access point identifier collected by a client device and geographic coordinates of the client device when the Wi-Fi access point identifier was collected. A cluster of geographic coordinates around a designated Wi-Fi access point is formed. A centroid within the cluster is identified. The location of the centroid is ascribed the geographic position of the designated Wi-Fi access point. The geographic position of the designated Wi-Fi access point is added to a Wi-Fi access point location database. A Wi-Fi tag scan list is processed to form a tag path listing known geographic locations of Wi-Fi access points observed by the Wi-Fi tag. The tag path is supplied in response to a request.

A tag has a Wi-Fi interface, a processor connected to the Wi-Fi interface, and a memory connected to the processor. The memory stores instructions executed by the processor to periodically determine whether to place the tag in a wake state, collect from the Wi-Fi interface a scan list during the wake state, where the scan list includes identifiers of Wi-Fi access points observed during the wake state. The scan list is stored and a sleep mode is entered.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
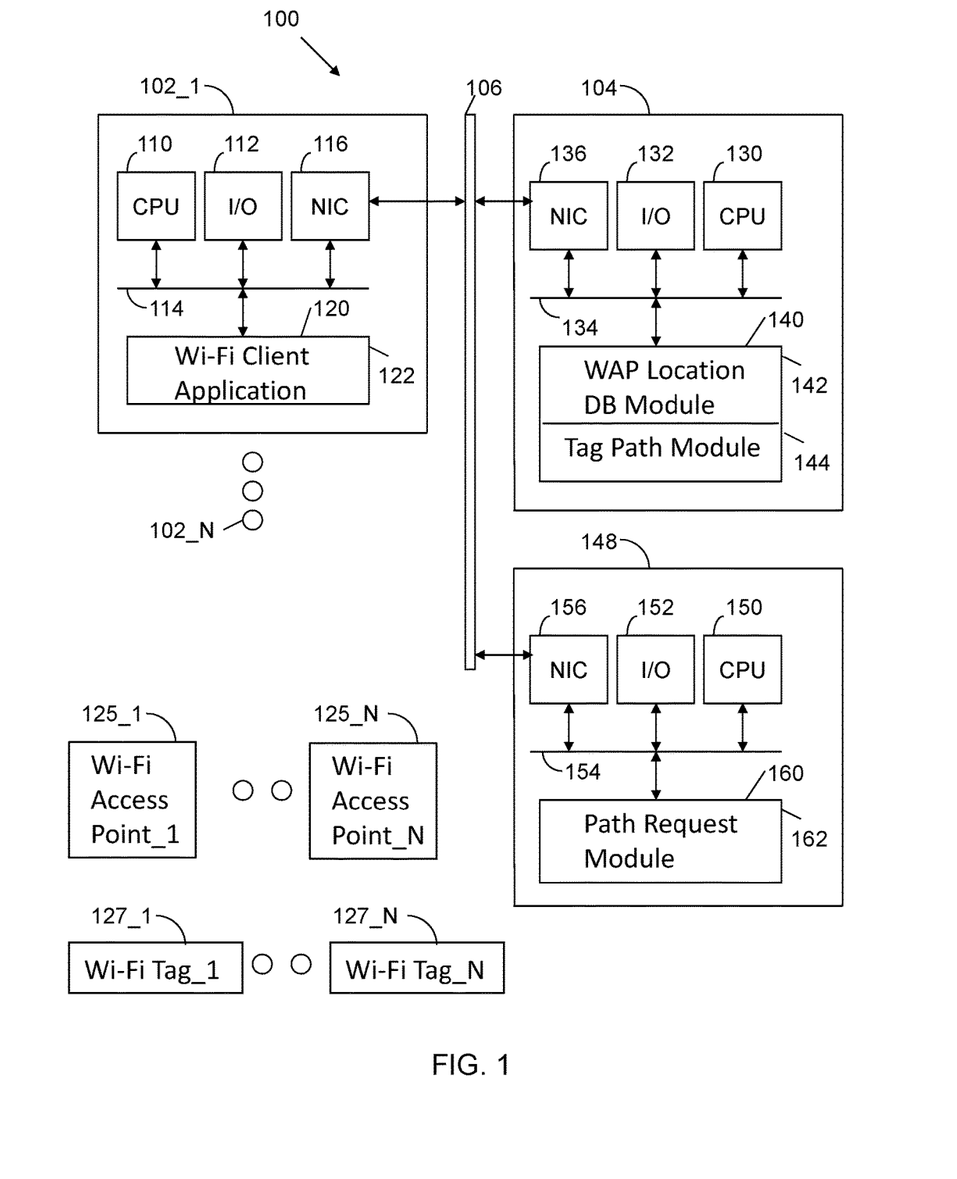
FIG. 1 is a system configured in accordance with an embodiment of the invention.

FIG. 1 illustrates a system 100 configured in accordance with an embodiment of the invention. The system 100 includes a set of client devices 102_1 through 102_N connected to at least one server 104 via a network 106, which may be any combination of wired and wireless networks.

Each client device (e.g., client device 102_1) includes a central processing unit 112 connected to input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores instructions executed by the central processing unit 110. In particular, the memory 120 stores a Wi-Fi client application 122 to implement operations disclosed herein. The client device 102_1 may be a computer, tablet, mobile phone, wearable device, game console and the like.

Server 104 also includes a central processing unit 130, input/output devices 132, bus 134 and network interface circuit 136. A memory 140 is connected to the bus 134. The memory 140 stores instructions executed by the central processing unit 130. In particular, the memory 140 stores a wireless access point (WAP) location database module 142. As its name implies, this module is configured to construct a database of physical locations for Wi-Fi access points. The memory 140 also stores a tag path module 144. The tag path module 144 associates a tag identifier with a set of geographic locations that establish a path. The geographic locations are WAP locations that the tag has observed in transit.

Each client device may use its network interface circuit 116 to make Wi-Fi connections to different Wi-Fi access points 150_1 through 150_N. Wi-Fi is a technology that allows electronic devices to connect to a wireless local area network (WLAN) through an access point. The term WAP is used herein to denote a Wi-Fi access point. WAP connections are commonly free and therefore may be leveraged for tracking an item in commerce.

FIG. 1 also illustrates a set of Wi-Fi tags 127_1 through 127_N. As discussed below, each Wi-Fi tag is a low cost, low power device that may be attached to an item in commerce. Free WAPs are used by the tag to periodically provide to the tag path module 144 lists of observed WAPs. The WAP location database module 142 may then be accessed by the tag path module 144 to collect a set of locations for known WAPs. The set of locations may be used to construct a path characterizing the movement of the Wi-Fi tag.

FIG. 1 also illustrates another machine 148 with standard components, such as a central processing unit 150, input/output devices 152, bus 154 and network interface circuit 156 to provide connectivity to network 106. A memory 160 is connected to the bus 154. The memory 160 stores a path request module 162 with instructions executed by the central processing unit 150. The path request module 162 solicits information on the geographic path associated with the movement of a Wi-Fi tag. The path request module 162 may access an application programming interface associated with the tag path module 144. The owner of machine 148 may also be the owner of Wi-Fi Tags 125_1 through 125_n. The individual Wi-Fi Tags are attached to items that are moved in commerce. The machine 104 tracks this movement. Machine 104 may supply movement reports to machine 148, may respond to requests from machine 148 and/or may provide an application programming interface that allows access to tag path information.

Figure 2:
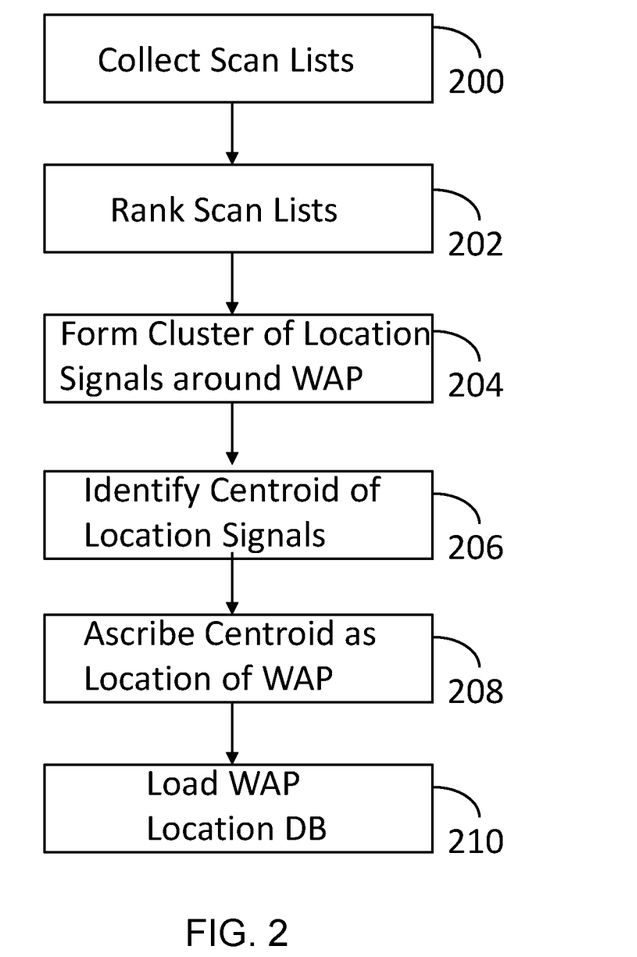
FIG. 2 illustrates operations used to construct a wireless access point location database in accordance with an embodiment of the invention.

FIG. 2 illustrates processing operations associated with an embodiment of the WAP location database module 142. Initially, scan lists are collected 200. The scan lists are collected from client devices 102_1 through 102_N via network 106. Each scan list includes individual entries specifying an access point identifier and physical coordinates of the client device when the access point was identified. The physical coordinates maybe GPS coordinates supplied by the client device.

The scan lists are then ranked 202. The rankings may be used to ascribe different weights to information generated by different client devices. In one embodiment, the ranking is based upon a mobile device value, a signal value and a measure of geographic accuracy. An example ranking schema is as follows:

Ranking=(Device Value*a large scale factor)+(Signal Strength*a small scale factor)−(Measure of geographic accuracy).

The large scale factor may be 100 times the small scale factor. The device value may be determined based upon whether the GPS of the client device is enabled. If so, the device value is significantly more (e.g., 5×) than if the GPS is not enabled. The measure of geographic accuracy may be a combination of the geographic accuracy of the data from the client device and the age of the collected data. The age may be the difference between the scan timestamp in seconds and the cache timestamp in seconds. The cache timestamp is a measure of how old geographic information is. The older the information, the less reliable it is since the client device may have moved from the recorded geographic location. While it is possible to obtain fresh geographic location in each communication session, a caching of geographic information is commonly implemented to preserve computation and battery resources.

The scan list rank is a measure of the reliability of the information received. The system receives scan lists from a variety of client devices with different levels of geographic accuracy. Information from a number of client devices about a single designated WAP may be prioritized based upon rank. The information may also be combined and weighted in accordance with ranks.

Figure 3:
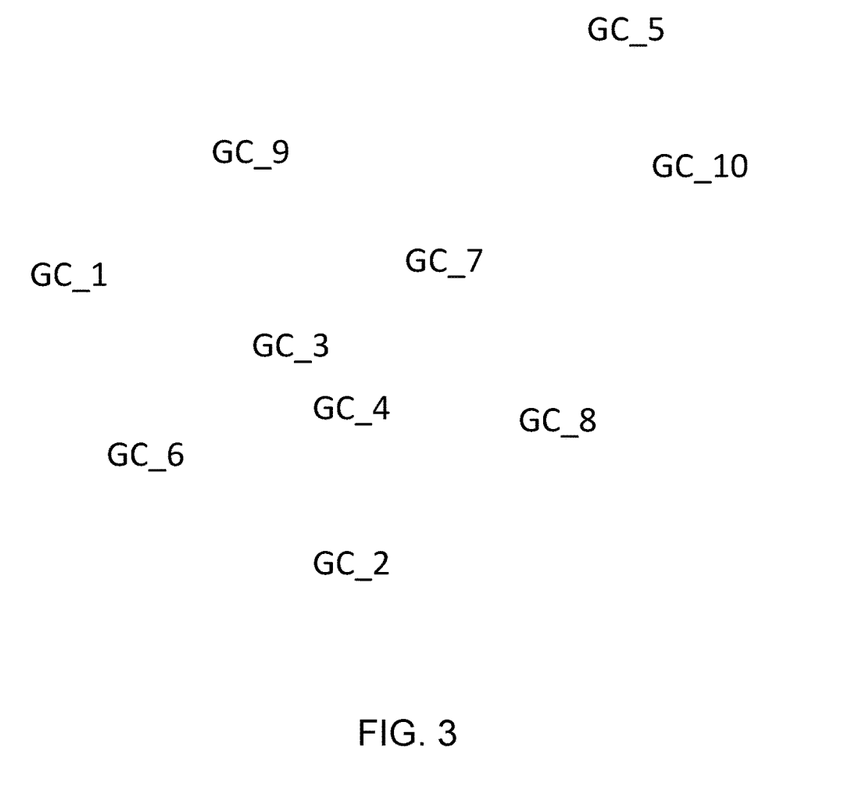
FIG. 3 illustrates a cluster of geographic coordinates associated with a Wi-Fi access point formed in accordance with an embodiment of the invention.

The next operation of FIG. 2 is to form a cluster of location signals around a WAP 204. The location signals are supplied by the client device each time the WAP is observed. FIG. 3 is an exemplary positioning of geographic coordinates (GC). Ten GC readings GC_1 through GC_9 are associated with this example for simplicity. The actual number of geographic coordinates may be much larger. The large number of coordinates may be from a single client device. Alternately, for any designated WAP, coordinates from different client devices may be aggregated.

Returning to FIG. 2, the next operation is to identify the centroid of the location signals 206. The centroid is the geometric center of all geographic coordinates shown in FIG. 3. It is the arithmetic mean or average position of all the points in the collection of points. Any number of known techniques may be used to compute the centroid and to assign a measure of confidence to it.

The centroid location is ascribed as the physical location of the WAP 208. The physical location is associated with a WAP identifier, which is loaded into a WAP location database 210. Thus, the WAP location database comprises a list of WAP identifiers and the physical location (e.g., GPS latitude and longitude) for each WAP.

The Wi-Fi client application 122 operative on the client devices 102_1 through 102_N is used to provide information to the WAP location database module 142 that results in the construction of a WAP location database. This database may now be leveraged in accordance with the techniques disclosed herein.

Figure 4:
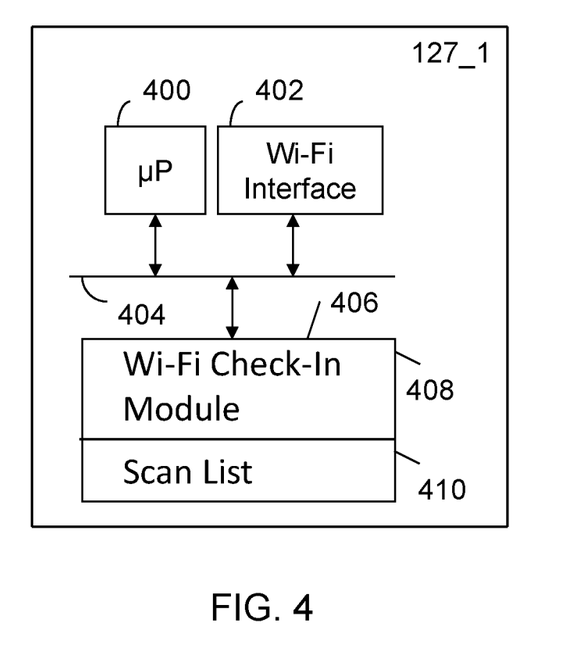
FIG. 4 illustrates a Wi-Fi tag configured in accordance with an embodiment of the invention.

FIG. 4 illustrates a configuration of a Wi-Fi tag 127_1 that may be used in accordance with an embodiment of the invention. The Wi-Fi tag 127_1 includes a microprocessor 400 and a Wi-Fi interface 402 connected via a bus 404. A memory 406 is also connected to the bus 404. The memory 406 stores instructions executed by the microprocessor 400. In particular, the memory 406 stores a Wi-Fi check-in module 408. The Wi-Fi check in module 408 periodically wakes the Wi-Fi tag 127_1 and scans local WAPs to form a scan list 410, which is stored in memory 406. If a free WAP is available, connection information and a scan list is uploaded to the tag path module 144 of server 104. The Wi-Fi tag is a low cost and low power device and therefore may be advantageously used in connection with the tracking of lower cost items. The low cost is attributable to the limited functionality provided by the microprocessor 400 and the utilization of free Wi-Fi access points, therefore obviating the need for a cellular data plan. The low power is attributable to the fact that the device is only periodically enabled to perform check-in operations.

Figure 5:
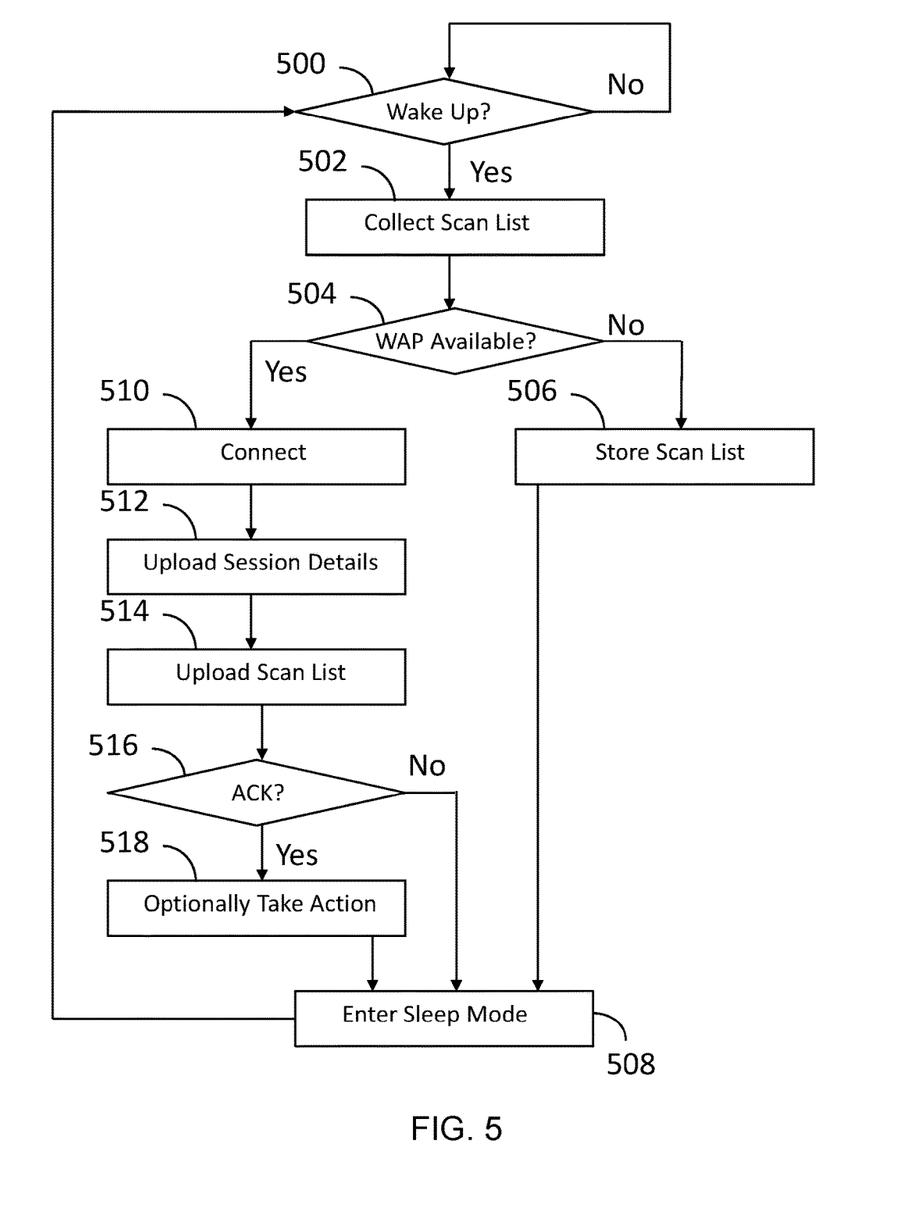
FIG. 5 illustrates Wi-Fi tag operations performed in accordance with an embodiment of the invention.

FIG. 5 illustrates processing operations associated with the Wi-Fi check in module 408. Periodically the device determines whether it should wake up 500. If so (500—Yes), the device wakes up and a scan list is collected 502. It is then determined whether a free WAP (e.g., unlocked and available without credentials) is available 504. If not (504—No), the scan list is stored 502 and the device enters sleep mode 508. The sleep mode is a processing state that is sufficient for checking whether to wake up the Wi-Fi tag and to store the scan list if persistent data is not available.

If a WAP is available (504—Yes), a connection is made to the WAP 510. Session details are then uploaded (512). The session details may include access point service set identification (SSID), basic service set identification (BSSID), signal strength, organization ID, a tag identification, a time stamp and device status. The session details also include a Domain Name System (DNS) request to contact server 104. Alternately, the session details may include a Hypertext Transport Protocol over Secure Socket Layer (HTTPS) Representational State Transfer (REST) call to the server 104.

If the tag has a stored scan list, it is uploaded 514. The device then waits for an acknowledgement 516 from the server 104. If an acknowledgement is not received during a specified time period (516—No), then the device enters sleep mode 508. If an acknowledgement is received (516—Yes), the device enters sleep mode 508, but optionally take some action 518 (e.g., change wake check periodicity) specified by the server during the acknowledgment.

Figure 6:
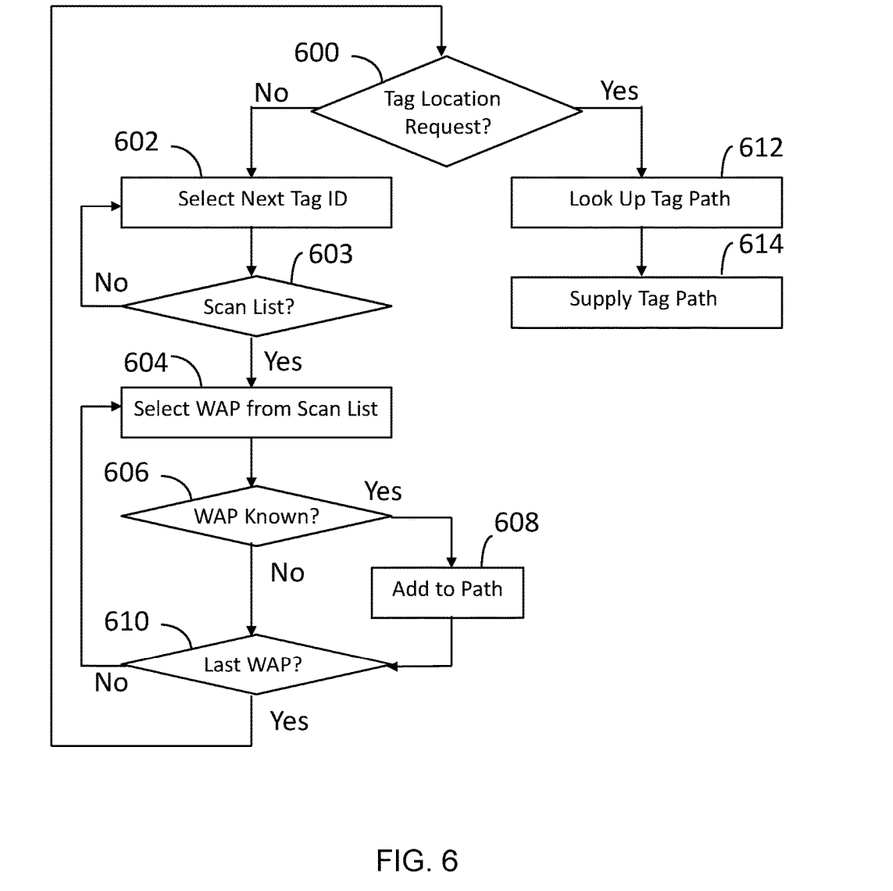
FIG. 6 illustrates operations to supply a tag path in accordance with an embodiment of the invention.

FIG. 6 illustrates processing operations associated with the tag path module 144. The tag path module 144 waits for a tag location request 600. The tag location request may be from the path request module 162. The tag location request may be in the form of an API call. If no request exists (600—No), a background process may be invoked to update Wi-Fi tag path information. Operations 602-610 may be performed as a background process. Alternately, the operations may be performed in a batch mode according to a schedule.

A tag identification is selected 602. It is then determined whether a scan list exists for the tag 603. If not (603—No), another tag identification is selected 602. If so (603—Yes) a WAP from the scan list is selected 604. It is then determined whether the WAP has a known geographic location 606. That is, the tag path module 144 accesses the WAP location database module 142 to obtain a geographic location for the WAP. If the WAP has a known geographic location (606—Yes), the geographic location is added to a path list 608 associated with the tag. If the WAP does not have a known geographic location (606—No), it is determined whether the WAP is the last in the list 610. If not (610—No), another WAP is selected from the list 604. If the last WAP in the list is processed (610—Yes), control returns to block 600. This processing produces a tag path for the tag. The tag path lists the geographic locations of the WAPs observed by the tag and thereby characterizes the geographic path of the tag. Accordingly, the location of an item attached to the tag may be tracked.

In response to a tag location request (600—Yes), the tag identification is used to look up a tag path 612. The tag path 614 is then supplied 614. In this way, the owner of a collection of Wi-Fi tags 127 may track the movement of the Wi-Fi tags in commerce. This provides a low cost and low powered alternative to current telematics solutions.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
a processor; and
a memory connected to the processor, the memory storing instructions executed by the processor to:
   collect scan lists from client devices, wherein each scan list specifies a Wi-Fi access point identifier collected by a client device and geographic coordinates of the client device when the Wi-Fi access point identifier was collected,
   form a cluster of geographic coordinates around a designated Wi-Fi access point,
   identify a centroid within the cluster,
   ascribe the location of the centroid as the geographic position of the designated Wi-Fi access point,
   add the geographic position of the designated Wi-Fi access point to a Wi-Fi access point location database,
   process a Wi-Fi tag scan list from a Wi-Fi tag to form a tag path listing known geographic locations of Wi-Fi access points observed by the Wi-Fi tag, wherein the Wi-Fi tag scan list includes a plurality of identifiers of Wi-Fi access points observed during periodic wake states of the Wi-Fi tag attached to an item in commerce, and
   supply the tag path in response to a request, wherein the tag path characterizes the movement of the item in commerce.

2. The server of claim 1 further comprising instructions executed by the processor to rank the scan lists.

3. The server of claim 2 wherein the instructions executed by the processor to rank the scan lists is based upon a mobile device value, a signal value and a measure of geographic accuracy.

4. The server of claim 3 wherein the mobile device value is a function of whether global positioning data is enabled on the mobile device.

5. The server of claim 3 wherein the signal value is a measure of signal strength from the designated Wi-Fi access point.

6. The server of claim 3 wherein the measure of geographic accuracy is derived from geographic accuracy information from the mobile device and a measure of the age of the geographic information.

7. The server of claim 1 in combination with the Wi-Fi tag, comprising:
a Wi-Fi interface,
a second processor connected to the Wi-Fi interface,
a second memory connected to the second processor, the second memory storing instructions executed by the processor to:
   (a) periodically determine whether to place the Wi-Fi tag in a wake state,
   (b) collect from the Wi-Fi interface a scan list during the wake state, wherein the scan list includes identifiers of Wi-Fi access points observed during the wake state of the Wi-Fi tag attached to an item in commerce,
   (c) store the scan list,
   (d) enter a sleep mode; and
   (e) repeat operations (a)-(d) to collect data to characterize the movement of the item in commerce.

8. The Wi-Fi tag of claim 7 further comprising instructions executed by the second processor to utilize the Wi-Fi interface to connect to a free Wi-Fi access point.

9. The Wi-Fi tag of claim 8 further comprising instructions executed by the second processor to upload session details to the server.

10. The Wi-Fi tag of claim 9 further comprising instructions executed by the second processor to upload the scan list to the server.

11. The Wi-Fi tag of claim 10 further comprising instructions executed by the second processor to wait for an acknowledgement from the server.

12. The Wi-Fi tag of claim 11 further comprising instructions executed by the second processor to take an action specified by the server.

* * * * *